United States Patent
Krah et al.

(10) Patent No.: US 6,854,899 B1
(45) Date of Patent: Feb. 15, 2005

(54) FERRULE FOR AN OPTICAL FIBER AND PROCESS FOR FASTENING THE FERRULE ON THE OPTICAL FIBER

(75) Inventors: Thorsten Krah, Altrip (DE); Juergen Bauer, Ingolstadt (DE)

(73) Assignee: Tyco Electronics Amp GmbH (DE)

( * ) Notice: Subject to any disclaimer, the term of this patent is extended or adjusted under 35 U.S.C. 154(b) by 0 days.

(21) Appl. No.: 09/572,491

(22) Filed: May 15, 2000

(30) Foreign Application Priority Data

May 20, 1999 (DE) ................................. 199 23 246

(51) Int. Cl.[7] ................................................ G02B 6/36
(52) U.S. Cl. ...................................................... 385/80
(58) Field of Search ............................ 385/80, 78, 72, 385/60

(56) References Cited

U.S. PATENT DOCUMENTS

| | | | | |
|---|---|---|---|---|
| 4,134,641 A | * | 1/1979 | Kao et al. ................... | 385/80 |
| 4,176,909 A | * | 12/1979 | Prunier ........................ | 385/85 |
| 4,355,862 A | * | 10/1982 | Kock ........................... | 385/81 |
| 4,859,827 A | * | 8/1989 | Coyle et al. ................ | 219/121.64 |
| 4,880,290 A | | 11/1989 | Kumazawa et al. ....... | 350/96.2 |
| 6,282,349 B1 | * | 8/2001 | Griffin ........................ | 385/81 |

FOREIGN PATENT DOCUMENTS

| | | | | |
|---|---|---|---|---|
| DE | 28 01 603 A1 | 7/1978 | ............. | G02B/5/14 |
| DE | 41 20 429 A1 | 2/1992 | ............ | B23K/20/18 |
| DE | 198 49 026 A1 | 4/2000 | ............. | G02B/6/36 |
| JP | 62111216 | 5/1987 | ............. | G02B/6/36 |
| JP | 63137202 | 6/1988 | | |

OTHER PUBLICATIONS

European Search Report, Reference No. 99 1875 EP/DE, Application No. 00110488.4–2205–, Applicant, Tyco Electronics Logistics AG.

* cited by examiner

*Primary Examiner*—Neil Abrams
*Assistant Examiner*—Phuong Dinh

(57) ABSTRACT

A ferrule (4) according to the invention for an optical fiber (1) is characterised in that the ferrule (4) is produced from plastics material and is welded on the optical fiber (1), which also consists of plastics material, preferably by ultrasound. The cladding (2) of the optical fiber (1) comprises depressions (3) which on welding also produce an interlocking fit in addition to the material connection.

16 Claims, 1 Drawing Sheet

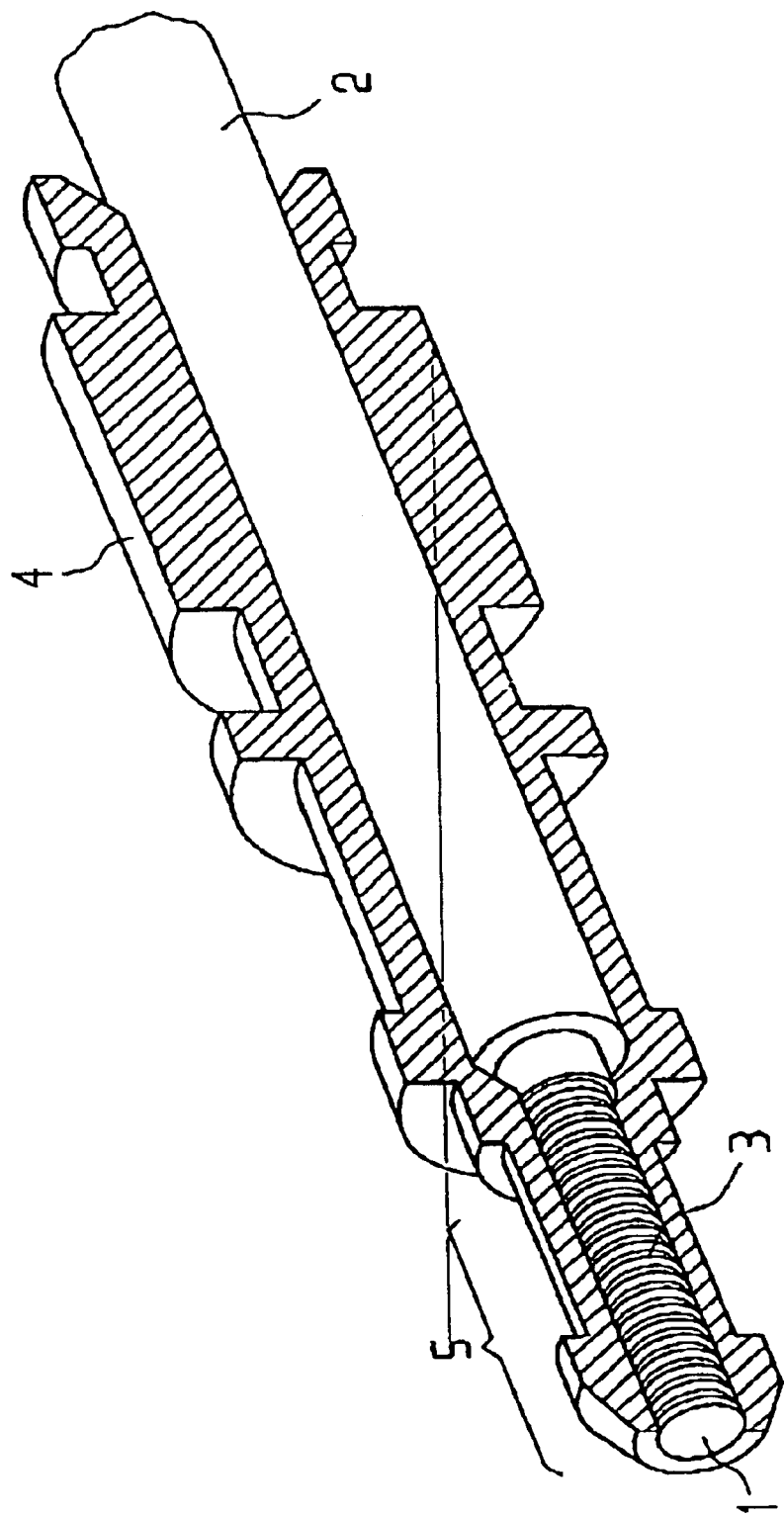

FERRULE FOR AN OPTICAL FIBER AND PROCESS FOR FASTENING THE FERRULE ON THE OPTICAL FIBER

FILED OF INVENTION

The present invention relates to a ferrule for an optical fiber and to a process for fastening a ferrule on an optical fiber.

DESCRIPTION OF RELATED ART

During the coupling of electric-optical transmitters such as, for example, LEDs and laser diodes and electric-optical receivers such as, for example, photodiodes and phototransistors by means of a light-conducting fibre or during the optical connection of two separate optical fibres (made, for example, of plastics material) to one another, the problem arises that the end faces of the light-conducting fibres have to be brought and held very precisely in position relative to the corresponding transmission or receiving surfaces. The optical axes have to overlap exactly and have to join one another very closely, i.e. they have to be positioned exactly in both a radial and an axial direction.

To ensure that an optical fibre is coupled perfectly to a transmitter or to a receiver or to ensure a perfect fibre/fibre coupling, the end of the optical fibre in known optical plug connections is pre-cut and terminated with a tube, a so-called ferrule (also known as an "insert").

The fastening of the ferrule on the optical fibre must be resistant to pulling, without damaging the optical fibre or influencing its optical properties at all.

Known fastenings on an optical fibre produce a connection to the optical fibre in that, for example, a crimp connection is arranged on the optical fibre. There is the risk here, however, that the optical fibre will be damaged or the optical properties will be adversely affected.

SUMMARY OF INVENTION

It is accordingly the object of the present invention to provide a ferrule for an optical fibre and a process for fastening a ferrule on an optical fibre, the ferrule being fastened securely on the optical fibre, even when used in a motor vehicle, i.e. with high forces of extraction. Furthermore, optical damping of the optical fibre should be avoided as far as possible, and production by the process should allow short cycle times and incur low costs.

This object is achieved by a ferrule for an optical fibre according to claim 1 and by a process according to claim 9.

A ferrule according to the invention for an optical fibre is accordingly characterised in that the ferrule is produced from plastics material, the ferrule being welded on a cladding of the optical fibre.

Furthermore, the process according to the invention for fastening a ferrule on an optical fibre comprises the following steps:

- axial stripping, in certain regions, of one end of the cylindrical optical fibre, a portion of a cladding of the optical fibre being removed radially;
- slipping of the ferrule over the stripped region of the optical fibre; and
- welding of the ferrule, at least in certain regions, on the contacting surface to the remaining cladding of the optical fibre.

Advantageous developments of the ferrule and of the process are recited in the respective sub-claims.

According to the present invention, the ferrule, which consists of a plastics material, is preferably fastened on the cladding of the optical fibre, which also consists of a plastics material, by ultrasonic welding.

The essential advantages according to the present invention are as follows:

- high-strength connection between ferrule and optical fibre;
- the ferrule can be produced inexpensively by injection moulding;
- economic pre-cutting and termination of the cable and production of the ferrule;
- high degree of automation possible during assembly;
- fitting of the ferrule on the optical fibre can be combined with machining of the end face of the optical fibre;
- the optical properties of the optical fibre are not affected.

DETAILED DESCRIPTION

A ferrule according to the invention for an optical fibre and the process according to the invention for fastening a ferrule on an optical fibre are shown in the drawing.

The FIGURE is a perspective view of an optical fibre with a ferrule applied, in a partial longitudinal section.

In the FIGURE, a ferrule 4 made of plastics material is arranged on an optical fibre 1 which is also produced from a plastics material.

In the embodiment illustrated, the optical fibre 1 comprises a light-conducting core and a double-shell cladding 2 consisting of an outer cladding and an inner cladding. The inner cladding (as viewed radially) has, in a weld region 5, embossed or cut external geometry which form depressions 3. The depressions 3 can preferably be designed as a thread.

This double-shell or double-layered construction of the cladding 2 of the optical fibre 1 from outer cladding and inner cladding is not absolutely essential for the present invention; the crucial factor is that, for the arrangement of the ferrule 4, there is a certain buffer available which reliably prevents damage to the core of the optical fibre 1 during the fastening of the ferrule 4.

In the case of the ferrule 4 shown in the figure, therefore, the outer cladding of the optical fibre 1 is initially stripped in one region.

The ferrule 4 is fastened on the optical fibre 1 by ultrasonic welding. The figure shows, for example, the region 5 in which the welded joint is produced. A more or less long (weld) region 5 can be provided, depending on the strengths required of the connection between ferrule 4 and optical fibre 1.

The optical fibre 1 and the ferrule 4 are connected to one another permanently and non-detachably by ultrasonic welding. Welding is carried out between the internal circumference of the ferrule 4 and the external circumference of the inner cladding.

In addition to the material connection between these two components, an interlocking fit between the two components is also produced by the depressions 3.

During the actual welding of the ferrule 4 to the inner cladding 3 (protective cladding for the core of the optical fibre) of the optical fibre 1, only the plastics material on these two parts is melted, and the optical fibre 1 is not significantly affected. Since the light-conducting fibre is not deformed mechanically as, for example, with crimping, no increase in the optical damping is associated with it. The extraction force of the ferrule relative to the optical fibre 1 is determined mainly by the quality of the material connection and by the cross-section of the weld seam.

This weld seam or the weld seams can be produced with an optional number of horns distributed in a circle round the ferrule 4.

The internal face of the ferrule 4 can have a smooth surface or can also be non-smooth in design, also with depressions, recesses, ribs, webs, etc., to simplify welding. In particular, relatively small accumulations of material such as, for example, at a rib, can be melted more easily and more quickly than a solid smooth face.

Rapid welding affords the advantage that damage to the core of the optical fibre 1 can be prevented.

The end face of the optical fibre 1 can be cut off, ground or smoothed simultaneously with welding.

During the welding of the ferrule 4 with the "protective cladding" of the optical fibre 1, only the plastics material of the protective cladding is melted so that the core (made, for example, of a polymer) of the optical fibre 1 is not noticeably affected. Since the fibre is not squeezed mechanically during welding (as, for example, with crimping), no increase in optical damping is observed.

A ferrule 4 according to the invention for an optical fibre 1 is characterised in that the ferrule 4 is produced from plastics material and is welded on the optical fibre 1 which also consists of plastics material, preferably by ultrasound. Depressions 3 which also produce an interlocking fit during welding in addition to the material connection, are also formed on the cladding 2 of the optical fibre 1.

Explicit reference is made to the associated drawing and the with respect to further features and advantages of the invention.

What is claimed is:

1. A process for fastening a ferrule on an optical fiber, comprising the steps of:
   axial stripping a portion of cladding from one end of an optical fiber
   slipping the ferrule over the stripped region of the optical fiber such that the ferrule does not protrude into or deform the optical fiber; and
   welding a contact region of said ferrule to said stripped region.

2. The process according to claim 1, wherein said ferrule comprises a plastics material.

3. The process according to claim 1, wherein ferrule is formed by an injection molding process.

4. The process according to claim 1, wherein said optical fiber comprises a plastics material.

5. The process according to claim 1, wherein the step of welding the ferrule to the optical fiber comprises using ultrasound.

6. The process according to claim 1, wherein said contact region comprises a smooth surface.

7. A cable assembly comprising:
   a ferrule comprising a plastics material;
   an optical fiber comprising a cladding, a core, an end, and a stripped region around said end, a portion of said cladding being removed from said stripped region, said stripped region being welded to said ferrule, said ferrule not protruding into or deforming said fiber.

8. The cable assembly according to claim 7, wherein the ferrule essentially has a hollow cylindrical shape, the optical fiber extending through the cavity.

9. The cable assembly according to claim 7, wherein the optical fiber has a non-smooth surface with depressions in the cladding at least in said stripped region.

10. The cable assembly according to claim 7, wherein the ferrule is produced by injection molding.

11. The cable assembly according to claim 7, wherein the ferrule has a plurality of elevations and/or depressions at the external circumference.

12. The cable assembly according to claim 7, wherein the ferrule is fastened on the optical fiber by ultrasonic welding.

13. The cable assembly according to claim 7, wherein said contact region comprises a smooth surface.

14. The cable assembly according to claim 7, wherein said stripped region has a non-smooth surface with depressions.

15. The cable assembly of claim 7, wherein said ferrule has a front end and a back end, and a contract region at said front end, said contact region being welded to said stripped region of said fiber.

16. The cable assembly according to claim 15, wherein the ferrule has a smooth surface at said contact region.

* * * * *